United States Patent
Hines et al.

(10) Patent No.: US 8,683,419 B1
(45) Date of Patent: Mar. 25, 2014

(54) POWER DOMAIN CROSSING INTERFACE ANALYSIS

(71) Applicant: Cadence Design Systems, Inc., San Jose, CA (US)

(72) Inventors: Mitchell W Hines, San Jose, CA (US); Chung-Fu Chang, San Jose, CA (US); Reuber Duarte, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/691,504

(22) Filed: Nov. 30, 2012

(51) Int. Cl.
*G06F 17/50* (2006.01)
(52) U.S. Cl.
USPC ............ 716/133; 716/109; 716/132; 716/136
(58) Field of Classification Search
USPC .................................. 716/109, 132, 133, 136
See application file for complete search history.

(56) References Cited

U.S. PATENT DOCUMENTS

| | | | | |
|---|---|---|---|---|
| 7,669,165 B2* | 2/2010 | Pandey et al. | ................. | 716/109 |
| 7,694,251 B2* | 4/2010 | Chandramouli et al. | ..... | 716/106 |
| 7,739,629 B2* | 6/2010 | Wang et al. | .................... | 716/136 |
| 7,954,078 B1* | 5/2011 | Wang et al. | .................... | 716/127 |
| 8,365,132 B2* | 1/2013 | Hsu et al. | ...................... | 716/133 |

\* cited by examiner

*Primary Examiner* — Naum Levin
(74) *Attorney, Agent, or Firm* — Kenyon & Kenyon LLP

(57) ABSTRACT

A method is provided to test an integrated circuit design for power management circuit design errors comprising: configuring a computer to identify multiple power domain crossing paths between pairs of power domains; identify one or more power related constraints associated with such power domain crossing paths; and group power domain crossing paths between matching power domain pairs that are associated with matching power related constraints.

25 Claims, 14 Drawing Sheets

POWER DOMAIN CROSSING INTERFACE ANALYSIS

BACKGROUND

An important consideration in integrated circuit design is conserving power in the manufactured IC. An integrated circuit may use more than one power supply voltage and may use more than one technique for power optimization. A power intent specification for an electronic circuit design often is provided that complies with a well recognized power intent specification format, such as the Common Power Format (CPF) or the Unified Power Format (UPF, e.g., both the Accellera UPF1.0 and IEEE 1801 aka UPF2.0) standards, for example. In general, a power intent specification is captured in one or more files and associated with a behavioral model of the design function, a manually created or synthesized design netlist in Verilog or VHDL format, or a manually created custom or an automatic place and route created design netlist in Verilog or VHDL format. The power intent specification describes power management constraints that are to be applied to the circuit design. A power intent specification will create power domains. A power intent specification also may specify voltage level shifting, driver or receiver isolation, power or ground switching, and state retention insertion constraints that are required for the low power function and can define existing low power features or features to be implemented during synthesis or place and route.

Testing an integrated circuit design that has or is specified to have power management circuitry specified in a power intent specification ordinarily involves determining whether power management constraints have been applied properly to the circuit design. Often, such testing involves determining whether power management constraints or power management circuit components specified by such constraints have been correctly applied or specified for application to signal paths within the circuit design. A typical integrated circuit design may include thousands or even millions of signal paths to which power management constraints are to be mapped. Testing and diagnosing issues on all paths can be a daunting challenge. There has been a need for an improved technique to test signal paths to which power management constraints have been mapped.

SUMMARY

In one aspect, a method is provided to test an integrated circuit design for power management circuit design errors. A computer is configured to identify multiple power domain crossing paths between respective pairs of power domains. For each identified power domain crossing path, one or more power related constraints are identified that are associated with such respective power domain crossing path. Power domain crossing paths that go between matching power domain pairs and that are associated with matching power related constraints are grouped together.

These and other features and advantages of the invention will be appreciated from the following illustrative drawings.

DESCRIPTION OF EMBODIMENTS

Figure 1:
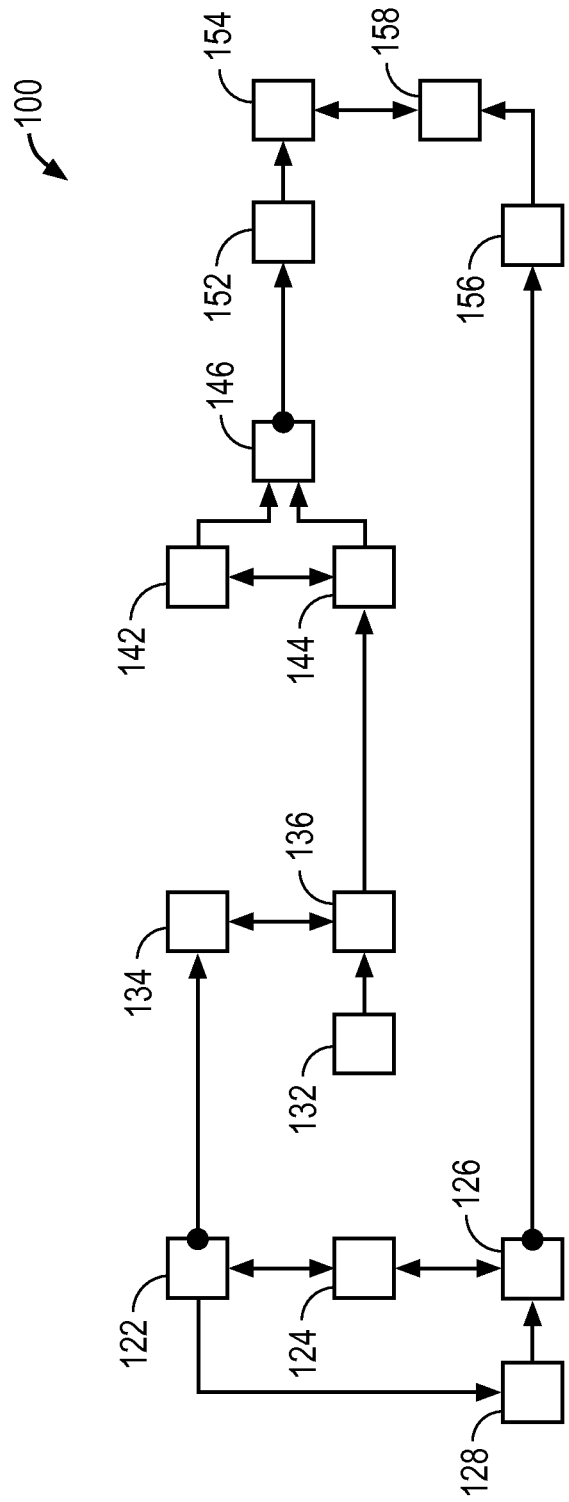
FIG. 1 is an illustrative drawing showing example circuit connectivity relationships among circuit design instances used to implement functional logic of an integrated circuit design.

The following description is presented to enable any person skilled in the art to create and use a method and system to identify and group together power domain interface crossing paths having like power management circuitry within an integrated circuit design for evaluation as a group. Various modifications to the example embodiments herein will be readily apparent to those skilled in the art, and the principles defined herein may be applied to other embodiments and applications without departing from the spirit and scope of the present disclosure. Moreover, in the following description, numerous details are set forth for the purpose of explanation. However, one of ordinary skill in the art will realize that the present disclosure might be practiced without the use of these specific details. In other instances, well-known data structures and processes are shown in block diagram form in order not to obscure the description of the present disclosure with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present disclosure is not intended to be limited to the example embodiments shown herein, but is to be accorded the widest scope consistent with the principles and features disclosed herein.

FIG. 1 is an illustrative drawing showing circuit connectivity relationships among design instances used to implement functional logic of an integrated circuit design 100 stored in a computer readable storage device. As used herein 'functional logic' includes circuitry used to perform functional operations of the circuit design. Functional logic includes combinatorial logic circuitry and sequential circuitry. As used herein, functional logic is distinct from power management circuitry used to manage power-control related operations. Power management related operations include power domain voltage isolation and voltage level shifting between power domains, for example. During the process of designing an integrated circuit (IC), a circuit designer often uses software-based graphical circuit design tools to build schematic representations of circuit designs that include symbolic representations of logical components such as inverters and other logical gates and symbolic representations of more complex functional components such as adders or Phase Lock Loops (PLLs), for example. In a hierarchical design, the schematic representations of components at a more abstract higher level of a design hierarchy hide design details shown within corresponding schematic representations at less abstract lower levels of the design hierarchy. In a cell-based IC design, repetitive blocks of circuitry are represented by cells that may be accessed from a design cell library using the software tool. In a cell-based hierarchical IC design, cells disposed higher in an IC design hierarchy may contain instances of other cells lower in the hierarchy.

The example integrated circuit design 100 includes a plurality of design instances 122-158 connected by signal paths, indicated by arrows, to implement an example integrated circuit design. Signal paths having two-headed arrows indicate paths for two-way communication. Persons skilled in the art will appreciate that an integrated circuit design typically may include a large number of design instances, perhaps thousands, hundreds of thousands or more and also typically may include a large number of signal paths, perhaps thousands, hundreds of thousands or even millions. Thus, the example design is greatly simplified so as to not obscure aspects of the disclosure in technical details.

Design instances that communicate with each other within a functional design are connected by signal paths used to send and receive signals between the instances within the design. A signal path may include a transmitter circuit disposed within a sending design instance that is coupled to send a signal over the path and a receiver circuit disposed within a receiving design instance that is coupled to receive a signal over the path. A given design instance may be coupled to act as a sender over some signal paths and may be coupled to act as a receiver over other signal paths. Moreover, in a hierarchical design, top level design instances ordinarily are connected by signal paths between top level design pins, while lower level design instances that are constituents of a top level hierarchical design instance may be connected by lower level signal paths internal to the top level design instance.

Figure 2:
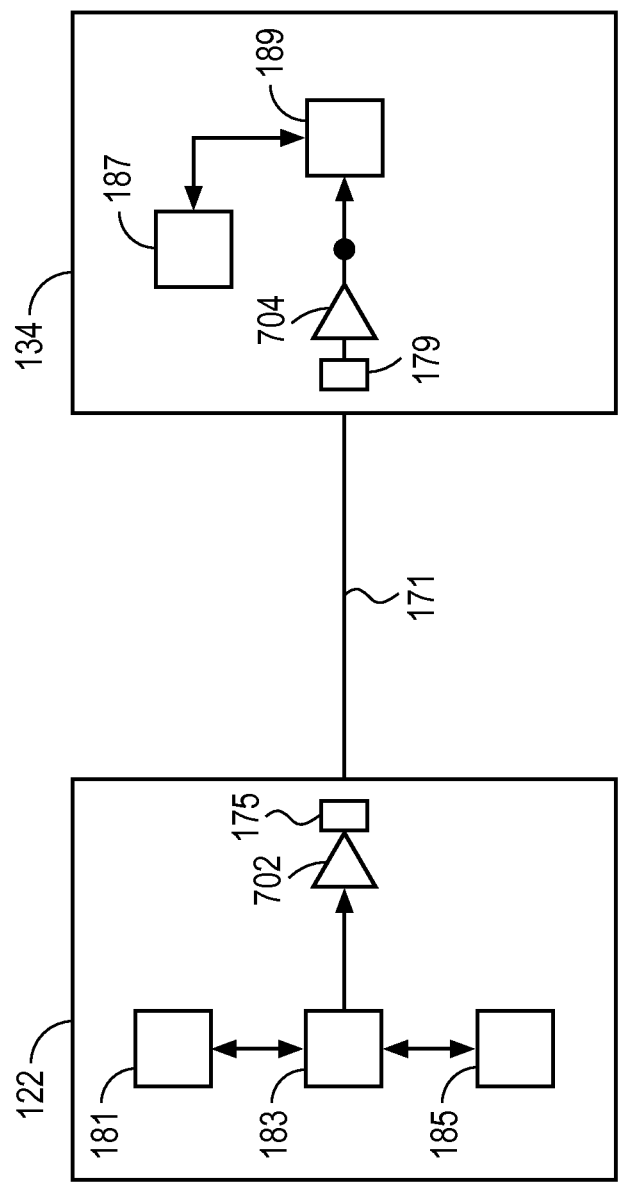
FIG. 2 is an illustrative drawing showing additional example details of functional design instances and a signal path of the illustrative circuit design of FIG. 1.

FIG. 2 is an illustrative drawing showing additional example details of functional design instances 122 and 124 and showing a signal path 171 between design instances 122 and 134 of the illustrative circuit design of FIG. 1. Design instance 122 includes a driver circuit instance 702 coupled to transmit/drive a digital signal onto top level pin design object 175 included within the design instance 124. Design instance 134 includes a receiver driver circuit instance 704 coupled to receive a digital signal on top level pin design object 179 included within the design instance 134. Driver 702 and receiver 704 are an example of a driver, receiver pair in which a digital signal transmitted by transmitter driver circuit instance 702 over the signal path 171 is received by the receiver driver circuit instance 704. The signal path 171 is represented within a design as a 'net' that connects the top level pin design object 175 with the top level design instance pin 704. Design instance 124 also includes constituent lower level design instances 181-185 connected as shown to each other and to driver circuit instance 702 by signal paths indicated by arrows. Design instance 134 also includes constituent lower level design instances 187-189 connected as shown to each other and to driver circuit instance 704 by signal paths indicated by arrows.

Figure 3:
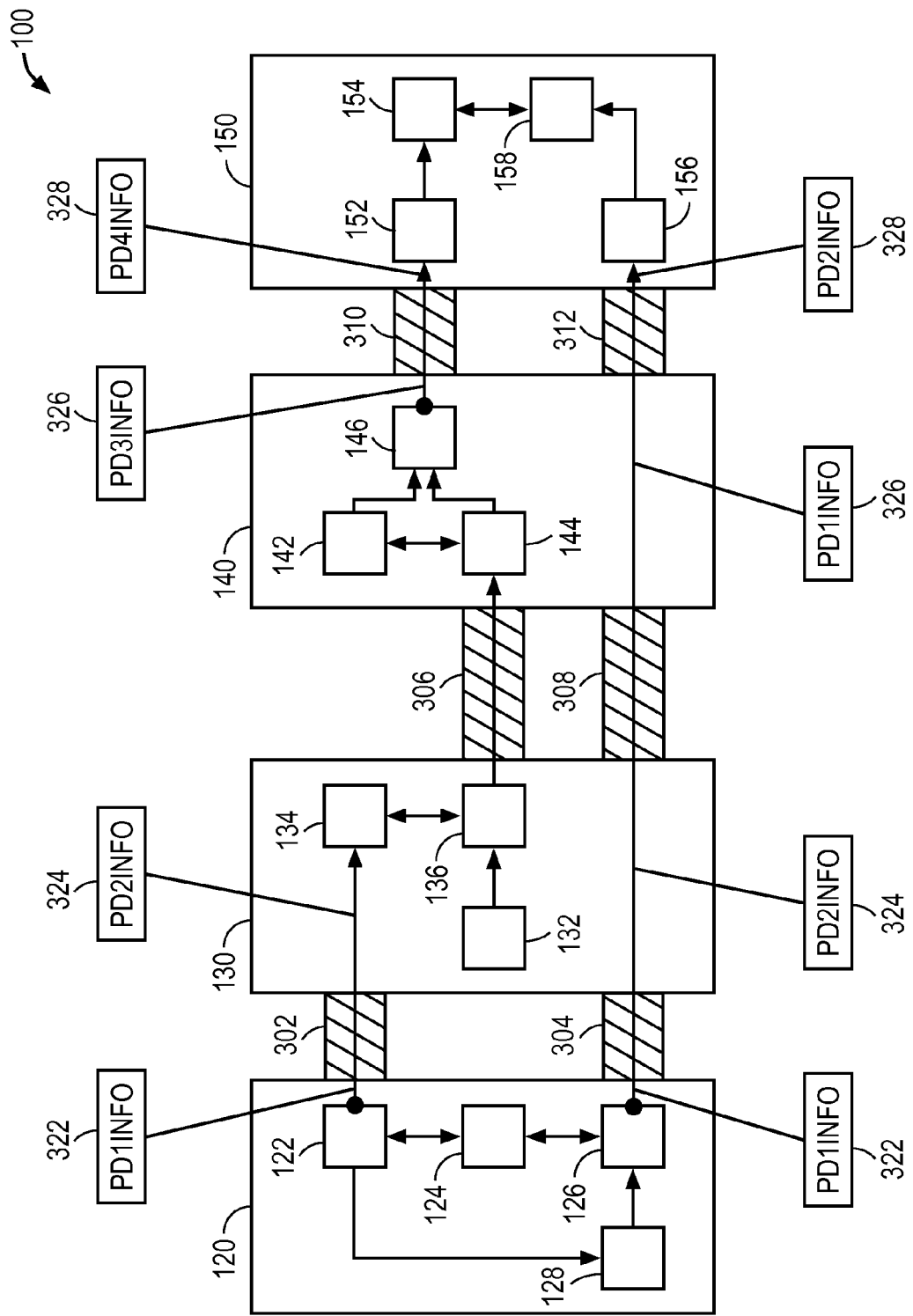
FIG. 3 is an illustrative drawing showing example circuit connectivity relationships among functional design instances used to implement the integrated circuit design of FIG. 1 in which design instances are associated with power domains.

FIG. 3 is an illustrative drawing showing circuit connectivity relationships among functional design instances used to implement the integrated circuit design 100 of FIG. 1 stored in the computer readable storage device in which design instances are associated with power domains. In FIG. 3, design instances 122-128 are shown as being assigned to a first power domain 120. Design instances 132-136 are shown as being assigned to a second power domain 130. Design instances 142-146 are shown as being assigned to a third power domain 140. Design instances 152-158 are shown as being assigned to a fourth power domain 150.

In accordance with some embodiments, a power domain is defined in terms of circuit design blocks and components that are subject to or share the same power supply rules; although the instantaneous power may change within a given power domain, all design blocks and components within that power domain share the same instantaneous power in common. A power domain ordinarily is specified using a power intent specification, contained in a file that identifies the design 'instances', e.g. design block instances, encompassed by the power domain, that specifies power modes (or states), that specifies a control function to selectively transition instances within the power domain between the different power modes, and that also may specify associated power management support circuitry, such as power switch cells, always-on cells, level shifter cells and isolation cells used to integrate the power-related behavior of blocks within the power domain with other circuit design components that are outside the power domain. A power intent specification indicates different power modes in terms of different power supply levels at which a power domain may operate and the conditions under which the power domain may operate at those different levels. The use of a power intent specification is explained in commonly assigned U.S. Pat. No. 7,739,629, which is expressly incorporated herein by this reference.

One or more signal paths of a functional design may cross between different power domains. An interface crossing is defined for each crossing of a signal path between different power domains within the design. Thus, each path crossing between power domains corresponds to a different power domain interface through which a signal path passes from one power domain to another power domain. An indication of each interface crossing is stored in a computer readable storage device. In some embodiments, an interface is instantiated as a structure that denotes a boundary between two power domains through which a signal path passes. The presence of an interface crossing denotes a change in the applicable power domain rules on opposite sides of the interface. A path that crosses through a power domain interface may be subject to different power domain rules on opposite sides of the interface crossing. As such, an interface crossing can provide an indication to a software-based automated integrated circuit design tool, such as a synthesis tool or a simulation tool, that different power management support circuitry is applicable on opposite sides of the interface crossing. It will be appreciated that a typical integrated circuit design may have thousands, tens of thousands, or even hundreds of thousands or even more interface crossings through which signal paths cross between different power domains.

Figure 4:
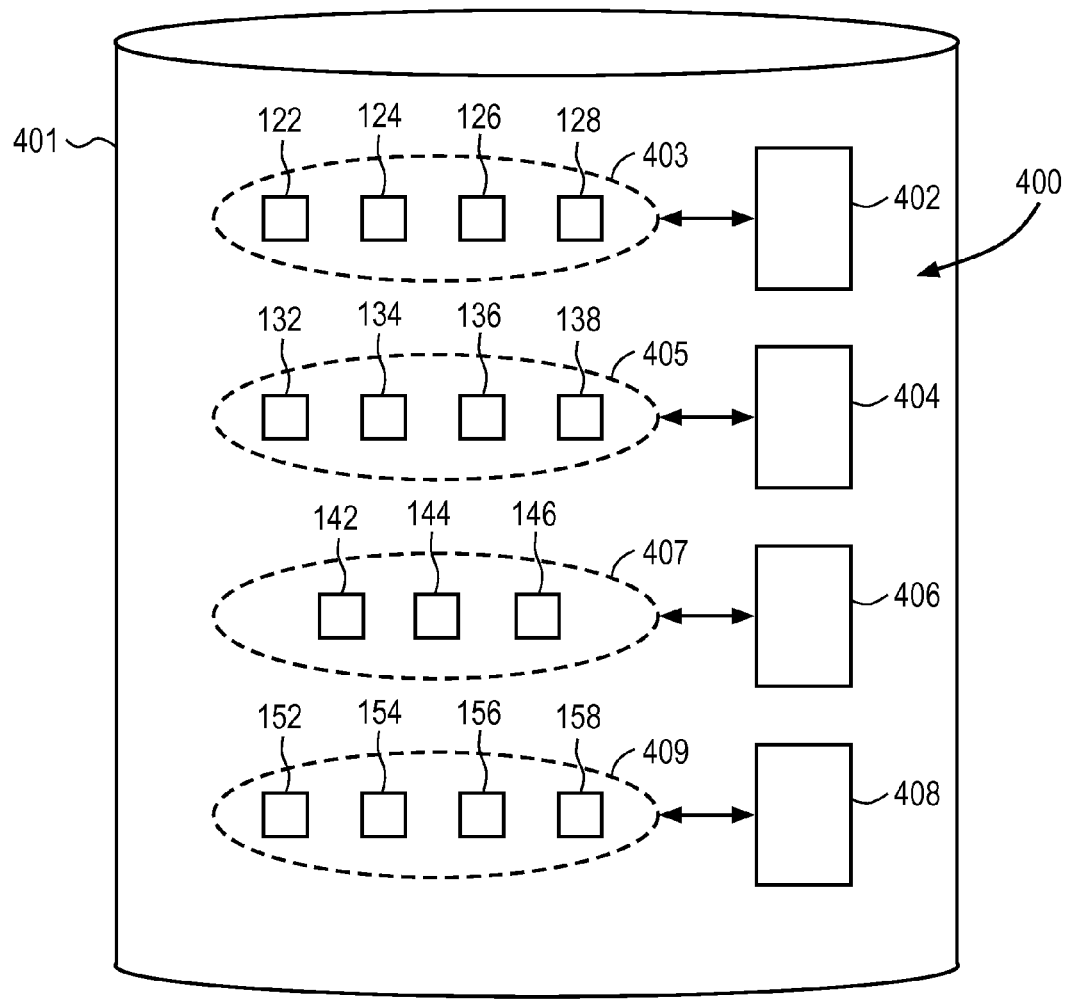
FIG. 4 is an illustrative drawing representing an example power constraint data structure stored in a computer readable storage device that associates design instances from the circuit design of FIG. 1 with power domain power constraint information.

Referring again to FIG. 3, there are shown first and second interface path crossings 302, 304 disposed between the first power domain 120 and the second power domain 130. Third and fourth interface path crossings are 306, 308 are disposed between the second power domain 130 and the third power domain 140. Fifth and sixth interface path crossings are 310, 312 are disposed between the third power domain 140 and the fourth power domain 150. FIG. 4 is an illustrative drawing representing an example power constraint data structure 400 stored in a computer readable storage device 401 that associates design instances from the circuit design 100 of FIG. 1 with power constraint information files 404-408 for the first power domain 120. The dashed lines 403 indicate that functional design instances 122-128 are associated in the storage device with first power constraint information file 402 that defines the first power domain 120. The dashed lines 405 indicate that functional design instances 132-136 are associated in the storage device with second power constraint information file 404 that defines the second power domain 130. The dashed lines 407 indicate that functional design instances 142-146 are associated in the storage device with third power constraint information file 406 that defines the third power domain 140. The dashed lines 409 indicate that functional design instances 152-158 are associated in the storage device with fourth power constraint information file 408 that defines the fourth power domain 150.

Table 1 provides an example of some of the kinds of power constraint information specified in the power constraint information files 402-408.

TABLE 1

| Power constraint Information | Explanation |
| --- | --- |
| Power Domain | Unique name for each group of circuits that share the same or equivalent power and ground supply nets |
| Isolation Strategy | Directive to insert isolation; includes type, control signal, and specific location on a crossing between power domains |
| Level Shifter Strategy | Directive to insert level shifter; includes type and specific location on a crossing between power domains |
| Driver to Receiver Composition | All library cells (buffers, isolation, level shifters, macro model feed-through, all hierarchical design block instance ports, and the sequence of where each exists relative to the others) |
| Domain information of the path components | Driver domain(s) to include all the library objects, the intermediate hierarchies, and the driver and receiver |

TABLE 1-continued

| Power constraint Information | Explanation |
| --- | --- |
| Low Power constraints on the instance pins | Relevant isolation and/or level shifter strategies that apply to those pins directly (the inserted cell needs to be driving or receiving that pin) or indirectly (the inserted cell drives or receives but does not connect directly to it) |

It will be understood that in a hierarchical design, constituent lower level design instances and design objects inherit the constraint information file association of the higher level design instance that they belong to by default which can be overridden by an explicit assignment of a different domain for specific instances while all other child instances not specified will inherit the parent domain definition. For example, pin design object 175 is a constituent at a lower level of a design hierarchy than higher level design 122, and therefore, inherits its association with the first power constraint information file 402. Similarly, pin design object 179 is a constituent at a lower level of a design hierarchy than higher level design file 134, and therefore, inherits its association with the second power constraint information file 404.

At a register transfer level (RTL) design stage, each path that traverses an interface is annotated to indicate applicable power constraint information. In some embodiments, for example, the path annotation also may include annotation of top level pins, design block instance ports, buffer library cells, isolation cells, level shifter cells, and macro model feed-through paths that are on a signal path used to transmit or receive signals communicated between the two different power domains.

Referring again to FIG. 3, for example, a portion of the path on the first power domain side (left) of the first interface path crossing 302 is annotated with first power constraint information 322, and a portion of the path on the second power domain side (right) of the first interface path crossing 302 is annotated with second power constraint information 324. Path portions on either side of the second interface path crossing 304 are similarly annotated with the first and second constraint information 322, 324. Similarly, path portions on opposite sides of the third and fourth interface path crossings 306, 308 are annotated with second power constraint information 324 and third power constraint information 326. Likewise, path portions on opposite sides of the fifth and sixth interface path crossings 310, 312 are annotated with third power constraint information 326 and fourth power constraint information 328.

The path power constraints indicate to computer software-based automated integrated circuit design tools a need to insert power management support circuitry such as isolation logic or power and/or ground supply voltage level shifters on the signal path. In some embodiments, the path power constraints indicate isolation logic cells that are pre-existing or to be inserted on signal paths connecting two power domains that have different ON/OFF/STANDBY states and indicate voltage level shifting logic cells that are pre-existing or to be inserted on signal paths connecting two power domains that have different Power and/or Ground supply voltage levels.

Figure 5:
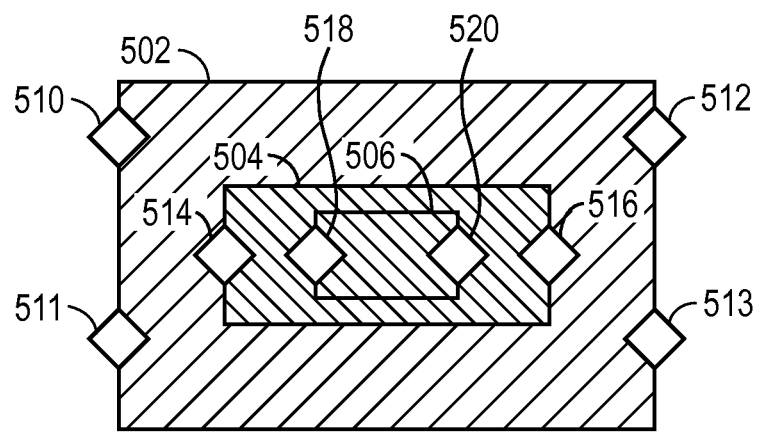
FIG. 5 is an illustrative drawing representing multiple hierarchical power domains and interfaces between them in accordance with some embodiments.
Figure 6:
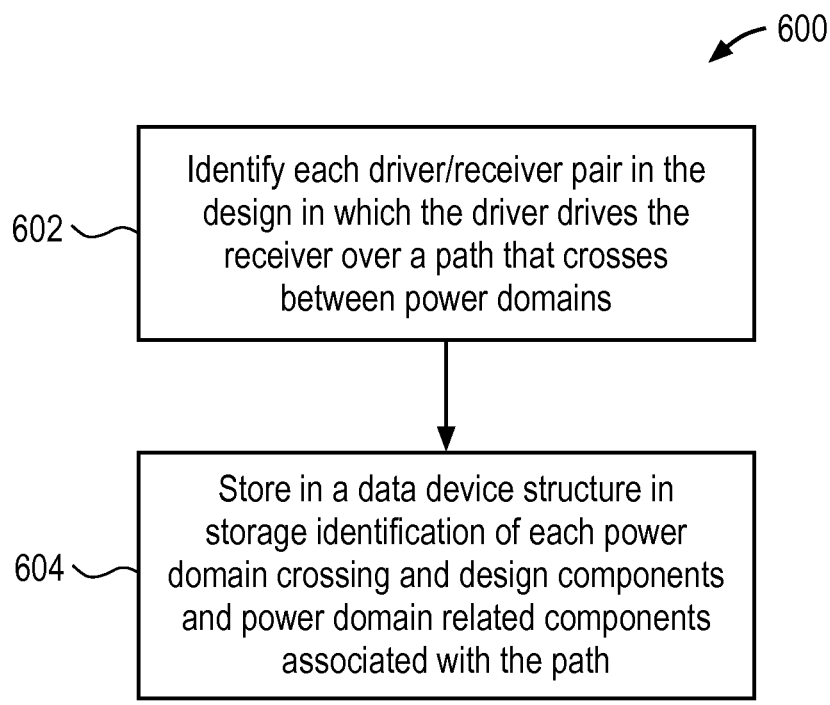
FIG. 6 is an illustrative flow diagram representing a process to determine crossings between different power domains within a design stored in a storage device in accordance with some embodiments.

FIG. 5 is an illustrative drawing representing multiple hierarchical power domains and interfaces between them in accordance with some embodiments. A first power domain 502 encompasses a second power domain 504, which in turn, encompasses a third power domain 506. In addition, the first power domain 502 and the power domains 504, 506 that it contains are encompassed within a Top power domain 508. Interface ports 510-513 are provided between power domains 508 and 506. Interface ports 514, 516 are provided between power domains 502 and 504. Interface ports 518, 520 are provided between power domains 504 and 506. Thus it will be appreciated that paths (not shown) passing through an interface port between hierarchically organized power domains may be annotated with different power constraint information (not shown) on opposite sides of the interface port resulting in the instantiation of different power management support circuitry (not shown) on either side of such interface port. FIG. 6 is an illustrative flow diagram representing a process 600 to determine crossings between different power domains within a design stored in a storage device in accordance with some embodiments. The process 600 can be performed for a design that is a register transfer level (RTL) description or to a design after gate level stage of development or to a design after place and route, for example. Module 602 identifies each instance of a driver/receiver pair in the design in which a driver drives a signal that crosses through a power domain interface port. In some embodiments, identifying driver/receiver pairs involves identifying a top level port of a circuit instance in one power domain that is connected by a path in the design with a top level port of a circuit instance in the design in a different power domain. Module 604 stores power domain crossing information for each signal that crosses a power domain. More particularly, module 604 stores a data structure that identifies, for each domain crossing path, design components and power management support circuitry inserted to the functional design that is associated with the path.

It will be appreciated that in the course of developing a circuit design, power management related circuitry is added to a functional design pursuant to a power constraint data structure, such as data structure 400, for example. The additional power management circuitry typically is added to circuit paths that connect a driver to a receiver over a path that passes through an interface port between two different power domains. It will be appreciated that the driver and receiver may be in the same or different power domains. The issue is whether the path crosses between power domains in traversing a design from the driver to the receiver.

It will be appreciated that such driver and receiver constitute functional logic of the circuit design as contrasted with power management related circuitry. Determining power domain interface crossings based upon the power domains of a functional logic driver and a functional logic receiver permits identification of endpoints of a power domain interface crossing without regard to power management circuitry that may be added to the path. Thus, power domain crossings advantageously can be identified from among the numerous (perhaps thousands or even millions of) paths between functional circuit components of a circuit design. As explained below, once these power domain crossing paths have been identified, power management circuitry that is added to these paths can be identified and evaluated more efficiently.

The RTL is usually hierarchical, just like a typical gate level netlist. A top level RTL design can contain many levels of hierarchy. Each of those levels of hierarchy may be designated to include a power domain. Interface ports connect nets and pins that cross different levels of an RTL hierarchy. Nets and pins that cross between different RTL hierarchy levels that are designated as different power domains constitute interface path crossings between power domains. Persons skilled in the art will understand that a synthesis engine can be used to create a gate netlist of an RTL function that preserves the RTL design hierarchy. Thus, power domains may be specified for hierarchy levels of an RTL design in which RTL interface path crossings couple signals between different power domains defined at different RTL hierarchy levels.

Figure 7:
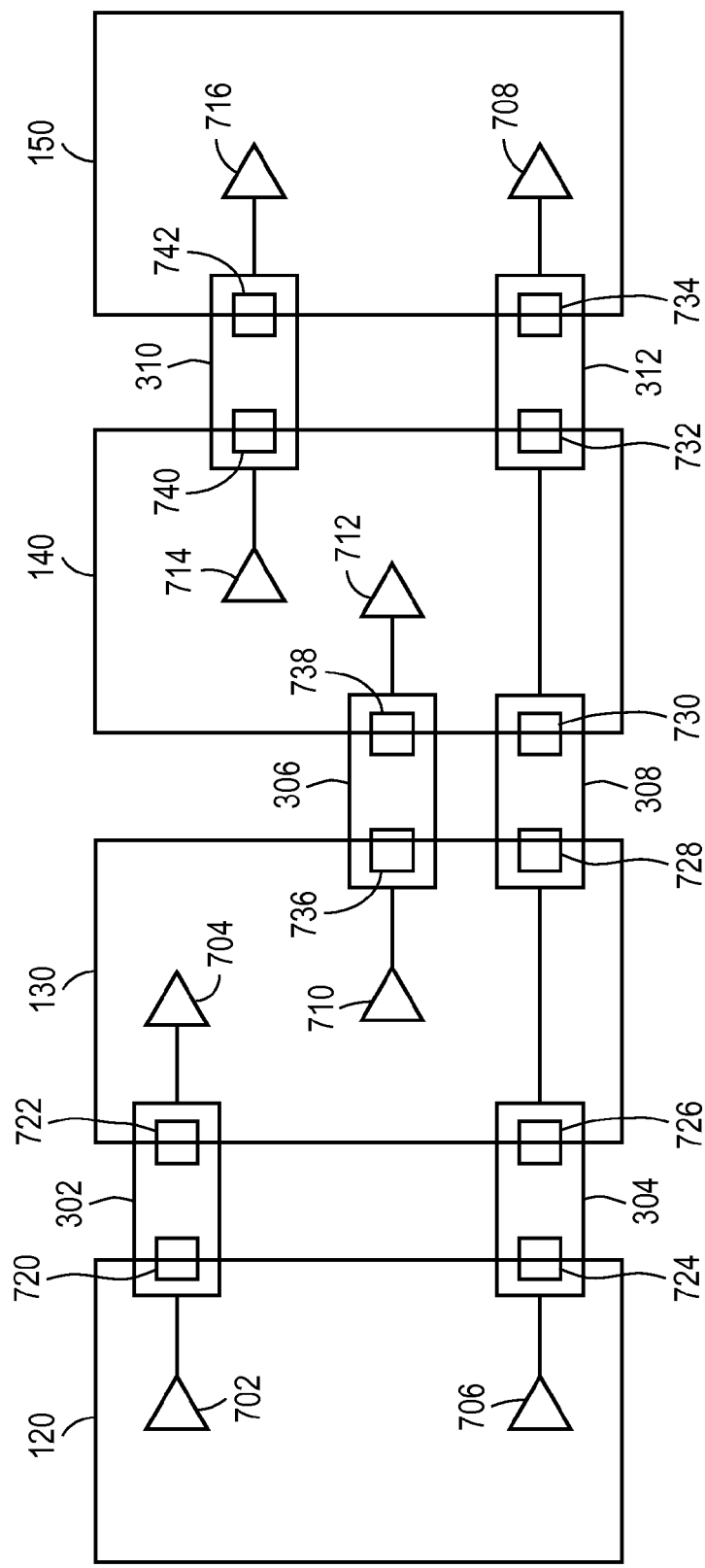
FIG. 7 is an illustrative diagram representing power domain interface crossings identified using the process 600 of FIG. 6 for the example circuit design and power domains of FIG. 3 in accordance with some embodiments.

FIG. 7 is an illustrative diagram representing power domain interface crossings identified using the process 600 of FIG. 6 for the example circuit design and power domains of FIG. 3 in accordance with some embodiments. The drawing in FIG. 7 is simplified to remove unnecessary details. A power domain interface crossing involves a signal path between a functional driver instance and a functional receiver in which the path starts at the driver, exits the power domain in which the driver is disposed and goes into a different power domain in the course of passing from driver to receiver. The driver and the receiver may or may not be disposed in the same power domain. In accordance with some embodiments, power domain path crossings are identified according to the process of FIG. 6, by tracing a signal path from a functional driver instance in one power domain to a functional receiver instance.

Referring to FIG. 7, a signal path from driver 702 to receiver 704 includes a single interface crossing 302, which comprises an output port of the first power domain 120 and an input port 722 of the second power domain. It will be appreciated that as shown in FIG. 2, the driver 702 is a constituent of design instance 122 and that driver 704 is a constituent of design instance 134. A signal 15 path from driver 706 to receiver 706 includes three interface crossings 304, 308 and 312. Driver 706 is a constituent of design instance 126 and receiver 708 is a constituent of design instance 156 shown in FIG. 1. Interface crossing 304 includes an output port 724 of the first power domain 120 and an input port 726 of the second power domain 130. Interface crossing 308 includes an output port 728 of 20 the second power domain 130 and an input port 730 of the third power domain 130. Interface crossing 312 includes an output port 732 of the third power domain 140 and an input port 734 of the fourth power domain 150. A signal path from driver 710 to receiver 712 includes interface crossing 306, which includes an output port 736 of the second power domain 130 and an input port 738 of the third power 25 domain 140. Driver 710 is a constituent of design instance 136 and receiver 712 is a constituent of design instance 144 shown in FIG. 1. A signal path from driver 714 to receiver 716 includes interface crossing 310, which includes an output port 740 of the third power domain 140 and an input port 742 of the fourth power domain 150. Driver 714 is a constituent of design instance 146 and receiver 716 is a constituent 30 of design instance 152 shown in FIG. 1.

Figure 8:
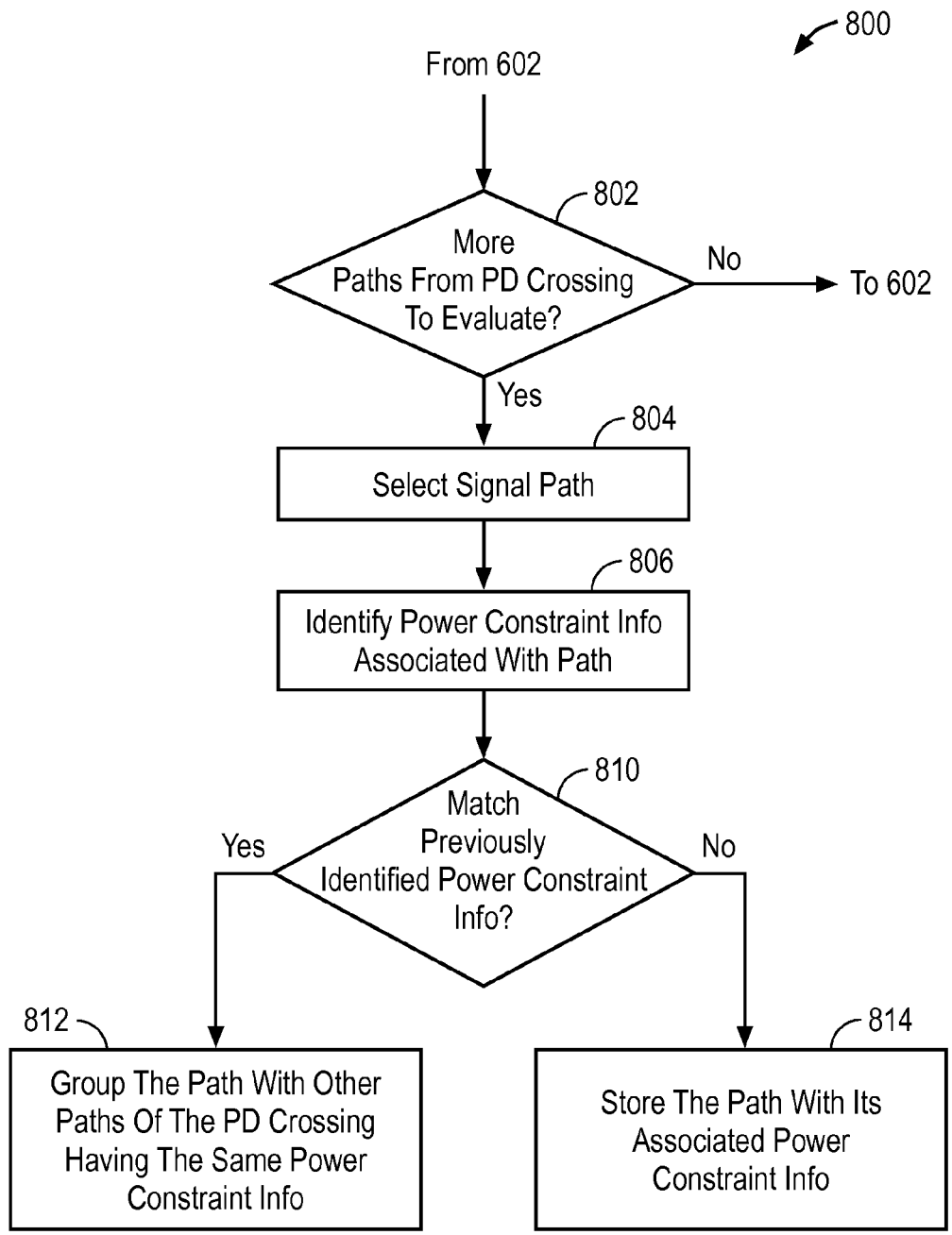
FIG. 8 is an illustrative flow diagram representing a process to determine groupings of path crossings within a power domain crossing for an RTL design stored in a storage device in accordance with some embodiments.

FIG. 8 is an illustrative flow diagram representing a process 800 to determine groupings of path crossings within a power domain crossing for an RTL design stored in a storage device in accordance with some embodiments. In particular, the process 800 provides additional details of acts performed by module 604 of FIG. 6 when evaluating power domain path crossings for an RTL design. It will be appreciated an RTL design provides a behavior level description of a circuit design that is converted through one or more known logic synthesis processes to gate level components and sequential models that implement the behavioral RTL model functionality.

It will be understood that there may be a multiplicity of signal paths that cross between a pair of power domains. In other words, one of the two power domains of the pair may have a multiplicity of driver instances that drive signals onto a corresponding multiplicity of signal paths for transmission to a corresponding multiplicity of receivers in the other of the two power domains. The process 800 determines groupings of these signal paths according to path power constraint information such as power constraint information 322-326 that is used to associate isolation logic and level shifter logic with the signal paths. In some embodiments, constraints for paths also may require isolation and/or level shifters (not shown). The grouping of signal paths based upon shared path power constraint information makes it feasible to determine as a group whether the path power constraint information shared by a group of signal paths complies with a power intent specification associated with a circuit design.

Decision module 802 determines whether there are additional signal paths identified for the power domain path crossing that have not yet been evaluated. If yes, module 804 selects a signal path and module 806 identifies path power constraint information associated in the storage device with the selected signal path. In some embodiments, identifying includes tracing a signal path between driver and receiver, and in the course of such tracing, identifying constraint information associated with the path and identifying an ordering of constraint information along the path and identifying what power domain along the path the constraint information is associated with. It will be noted that an isolation and/or level shifter constraint is associated with the design block instance pins, as directly driving or receiving that pin. Note that power and ground supply voltage conditions and relationships to those are stored in the power intent database and can be referenced during analysis of the crossings to check for compatibility issues.

Note that although the example in FIG. 7 shows crossing paths that start with a driver and end with a receiver, a crossing paths can start and end with different kinds of functional design structures (i.e. design structures that are constituents of a functional design as contrasted with design structures added pursuant to a power intent specification), such as a top level input pin or an output of a functional instance of a library cell anywhere in the design hierarchy and end at a top level output pin or the input of a functional instance of a library cell anywhere in the design hierarchy.

Decision module 810 determines whether the identified path power constraint information associated with the selected signal path matches path power constraint information associated with a previously selected and evaluated signal path from the same power domain crossing. In other words a determination is made as to whether a domain crossing path between the driver and receiver has the same type of hierarchical construction (i.e. goes through the same hierarchical blocks within the receiver and the driver through same or different instance ports within the driver and receiver) and has the same makeup for inserted cells and also the same power constraints applied to the corresponding pins. Thus, a determination is made independent of design object names, whether there is an exact match in terms of the path and the constraints and placement of constraints in the individual paths.

If decision module 810 determines that path power constraint information for the selected signal path matches path power constraint information for a previously evaluated path, then module 812 associates the selected path with in a data structure in storage with a group of (one or more) previously evaluated paths having the matching path power constraint information. If on the other hand, decision module 810 determines that there is no such match, then module 814 creates a new data structure in memory and associates the selected path and its associated path power constraint information with the new data structure. Following modules 812 or 814, whichever is selected in a given pass, control flows to decision module 802. The sequence repeats until decision module 802 determines that there are no further driver instances and corresponding signal paths to be evaluated.

Figure 9:
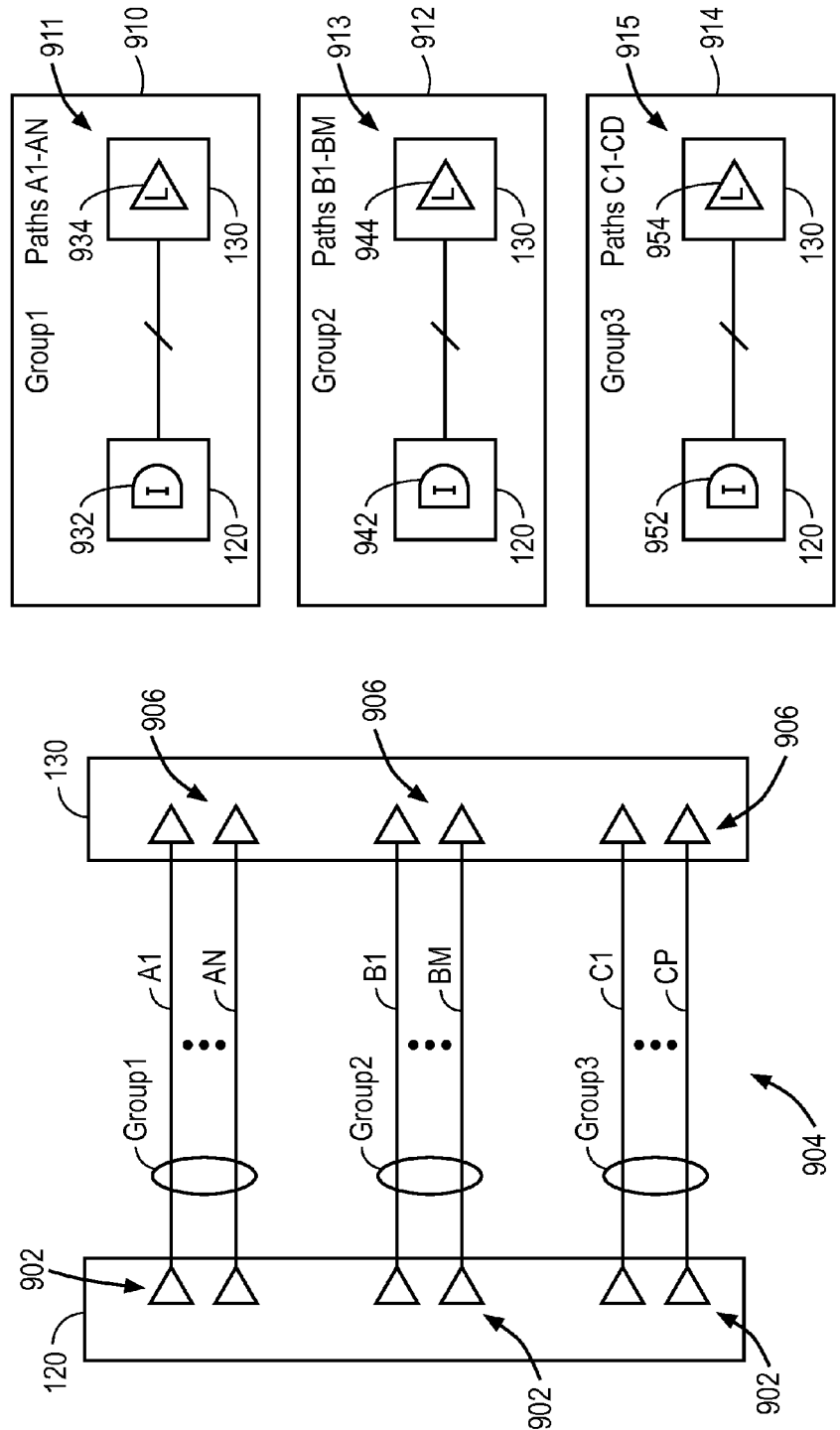
FIGS. 9A-9B are illustrative drawings representing groups of signal paths that are members of a power domain path crossing (FIG. 9A) and the organization of data structures created (FIG. 9B) and stored in a storage device pursuant to the process of FIG. 8 in accordance with some embodiments.

FIGS. 9A-9B are illustrative drawings representing groups of signal paths that are members of a power domain path crossing (FIG. 9A) and the organization of data structures created (FIG. 9B) and stored in a storage device pursuant to the process of FIG. 8 in accordance with some embodiments. FIG. 9A shows example groupings of signal paths for between the first power domain 120 and the second power domain 130, such as interface crossing 302 of FIG. 7. Details of the first and second power domains 120, 130 that are not relevant to this portion of the description are not shown so as not unnecessarily complicate the drawing. A multiplicity of driver instances 902 within the first power domain 120 drive signals onto corresponding signal paths 904 that communicate the signals with a multiplicity of receiver instances 906 within the second power domain 130. It will be appreciated that although this example describes an embodiment in terms of drivers at the beginning of a path and receivers at the other end of the path, in alternative embodiments, a path may have different functional structures at the beginning and end points of the path. The signal paths are grouped into three groups: Group1, Group2 and Group3. Group1 includes signal paths identified as pathA1 to pathAN. Group2 includes signal paths identified as pathB1 to path BM. Group3 includes signal paths identified as pathC1 to path CP.

FIG. 9B is an illustrative drawings representing organization of data structures 910-914 stored in a storage device to represent information about the three example groups, Group 1, Group2 and Group3. A first data structure 910 includes first path power constraint information 911 that is applicable to the plurality of signal paths associated with Group 1. The example first path power constraint information 911 of the first data structure 910 indicates that a first set of power constraints includes an isolation cell 932 is to be associated with the first power domain 120 and that a level shifter 934 is to be associated with the second power domain 130. The isolation cells 932 and the level shifters 934 are ordered relative to the paths in that the isolation cell 932 are disposed closer to the driver circuit instances, and the level shifters 934 are disposed closer to the receiver instances 906. The isolation cells 932 and level shifters 934 represent power management related circuitry. A second data structure 912 includes second path power constraint information 913 that is applicable to the plurality of signal paths associated with Group2. The example second path power constraint information 913 of the second data structure 912 indicates that a second set of power constraints includes level shifter cells 942 are to be associated with the first power domain 120 and that a both isolation cells 944 and level shifters 946 (not shown) are to be associated with the second power domain 130. The level shifter cells 942, the isolation cells 944 and level shifters 946 are ordered relative to the paths in that the level shifter cells 942 are disposed closer to the driver circuit instances 902 and the isolation cells 944 and level shifters 946 are disposed closer to the receiver instances 906. Moreover, the isolation cells 944 and level shifter cells 946 are ordered relative to the paths in that the level shifter cells 946 are disposed closer to the receiver instances than are the isolation cells 944. The level shifter cells 942 and the isolation cells 944 and the level shifter cells 946 represent power management related circuitry. A third data structure 914 includes third path power constraint information 915 that is applicable to the plurality of signal paths associated with Group3. The example third path power constraint information 915 of the third data structure 914 indicates that a third set of power constraints includes level shifter cell 952 is to be associated with the first power domain 120 and that an isolation cell 954 is to be associated with the second power domain 130. The level shifter cells 952 and the isolation cells 954 are ordered relative to the paths in that the level shifter cells 952 are disposed closer to the driver circuit instances 902 and the isolation cells 954 are disposed closer to the receiver instances 906. The isolation cells 932 and the level shifters 934 are ordered relative to the paths in that the level shifter cells 942 are disposed closer to the driver circuit instances and the isolation cells 944 are disposed closer to the receiver instances 906. The level shifter cells 952 and the isolation cells 954 represent power management related circuitry.

It will be appreciated that once the crossing data structures, e.g., structures 910, 912, 914, are complete an analysis, which forms no part of the present invention, can be performed as to whether power management circuitry associated with power domain crossing paths complies with requirements of a power intent specification. For example, an analysis may involve starting at the beginning of power domain crossing path and based on the isolation or level shifter constraint (or absence of) determine, based upon a power intent specification, whether a constraint is applicable, a required constraint is missing (based on power mode relationships between those two domains), or if the constraint has been satisfied by an existing cell and whether the cell is appropriate for the constraint based on type, location, and any applicable control signal. Then for each power management related issue identified for a power domain crossing path on a crossing, results are stored for presentation and for possible use to identify a defect in the power intent, lower power implementation tool, or the analysis. In some embodiments, a generic text description of a power domain crossing path with the constraints can be exported so that it can be evaluated independent of design details. In this manner domain crossing path issues can be addressed without exposing or providing external access to proprietary design data, for example.

Figure 10:
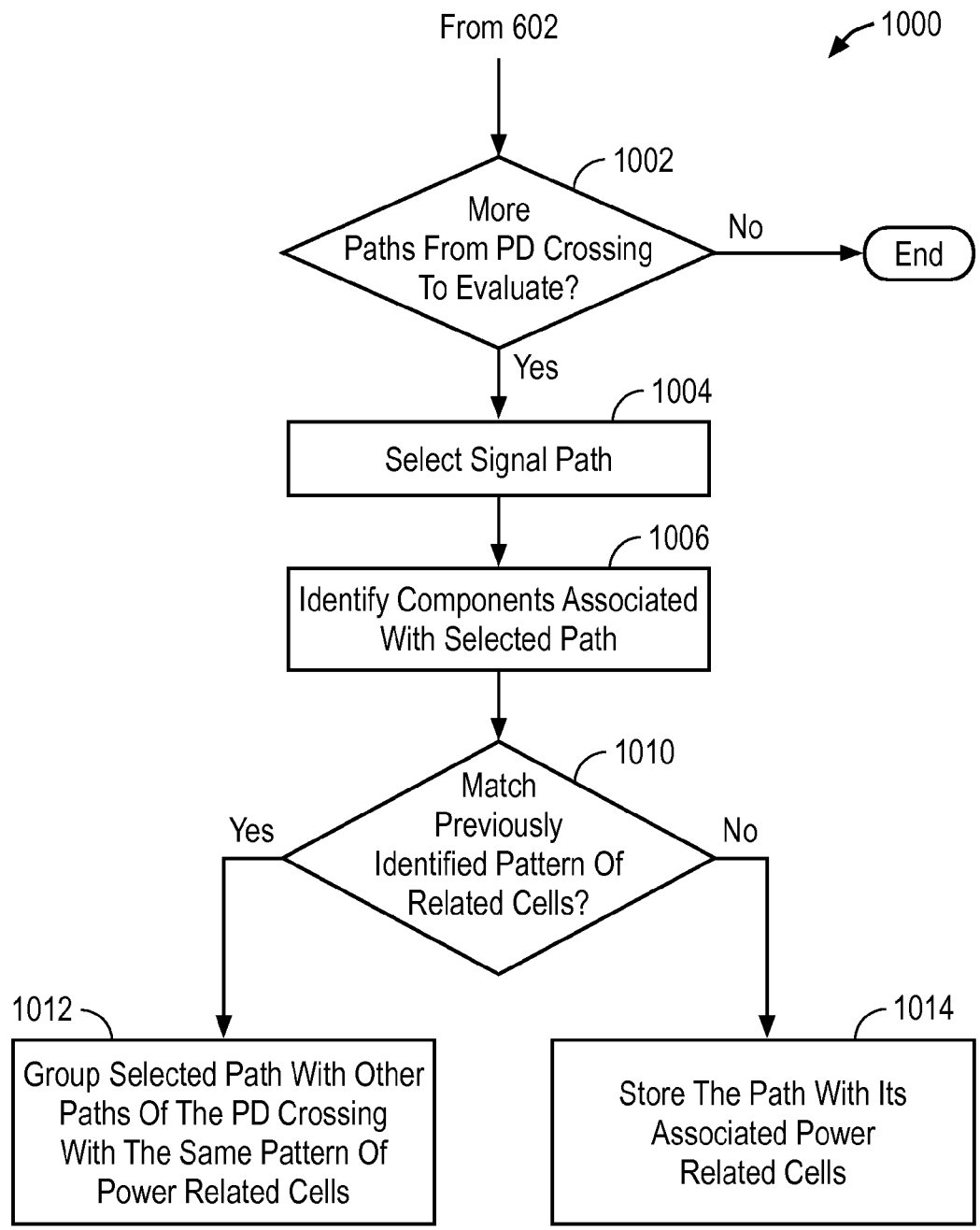
FIG. 10 is an illustrative flow diagram representing a process to determine groupings of path crossings within a power domain crossing for gate level design stored in a storage device in accordance with some embodiments.

FIG. 10 is an illustrative flow diagram representing a process 1000 to determine groupings of path crossings within a power domain crossing for gate level design stored in a storage device in accordance with some embodiments. In particular, the process 1000 provides additional details of acts performed by module 604 of FIG. 6 when evaluating power domain path crossings for a gate level design. It will be appreciated a gate level design provides a description of a circuit design at the logic gate level domain crossings between functional library cells and may or may not have inserted low power cells in those crossings and may or may not have low power constraints for those crossings. It will be appreciated that ordinarily, there is no architecture difference between a behavioral RTL model that is synthesized using standard primitive logic functions or a gate netlist from the synthesis of an RTL model that is targeted to a specific process technology with library cells that are based on standard logic primitive functions. In essence, the RTL model becomes a "Gate" netlist in the parsing of RTL with synthesis tools.

The process 1000 determines groupings of a plurality of signal paths of a power domain crossing according to actual power related library cells such as isolation cells and level shifter cells that have been inserted into a design. It will be appreciated, that during circuit synthesis in which a behavioral RTL design is converted to a gate level design, a synthesis tool configures a computer system to refer to a power constraint file such as the file 400 of FIG. 4 to determine what power related library cells such as isolation cells and level shifter cells to insert onto signal paths between different power domains. The process 1000 determines what power related cells have been inserted into each signal path of a power domain path crossing and groups paths according to matching patterns or combinations of power related cells inserted during a synthesis process. The grouping of signal paths based upon matched power related cell insertions makes it feasible to determine for paths as a group whether the inserted power cells comply with a power intent specification associated with a circuit design.

Decision module 1002 determines whether there are additional signal paths identified for the power domain path crossing that have not yet been evaluated. If yes, module 1004 selects a signal path and module 1006 identifies a combination or pattern of power related cells inserted on the selected signal path. In some embodiments, module 1006 determines by tracing a path in a design from driver to receiver, and in the course of tracing, determining what components are associated with the path. Significantly, module 1006 also considers buffers inserted during synthesis to amplify signal strength and their power domain must be compatible with the cell driving the signal net segment connected to the input and the cell receiving the signal net segment connected to the output. Buffers added through synthesis, for example, for signal integrity purposes, for example, and are not considered 'functional logic' as the term is used herein.

Decision module 1010 determines whether the identified combination or pattern of power related cells inserted on the selected signal path matches a combination or pattern of power related cells associated with a previously selected and evaluated signal path from the same power domain crossing. Matching requires that each path has the same hierarchical makeup, inserted power constraint related cells (e.g., level shifters and isolation) and buffers inserted during synthesis, for example.

If decision module 1010 determines that the identified combination or pattern of power related cells inserted to the selected signal path matches a combination or pattern of power related cells identified as inserted to a previously evaluated path, then module 1012 associates the selected path with in a data structure in storage with a group of (one or more) previously evaluated paths having the matching combination or pattern of power related cells. If on the other hand, decision module 1010 determines that there is no such match, then module 1014 creates a new data structure in memory and associates the selected path and an indication identifying the combination or pattern of power related cells identified as inserted to the selected path with the new data structure. Following modules 1012 or 1014, whichever is selected in a given pass, control flows to decision module 1002. The sequence repeats until decision module 1002 determines that there are no further driver instances and corresponding signal paths to be evaluated.

Figure 11A:
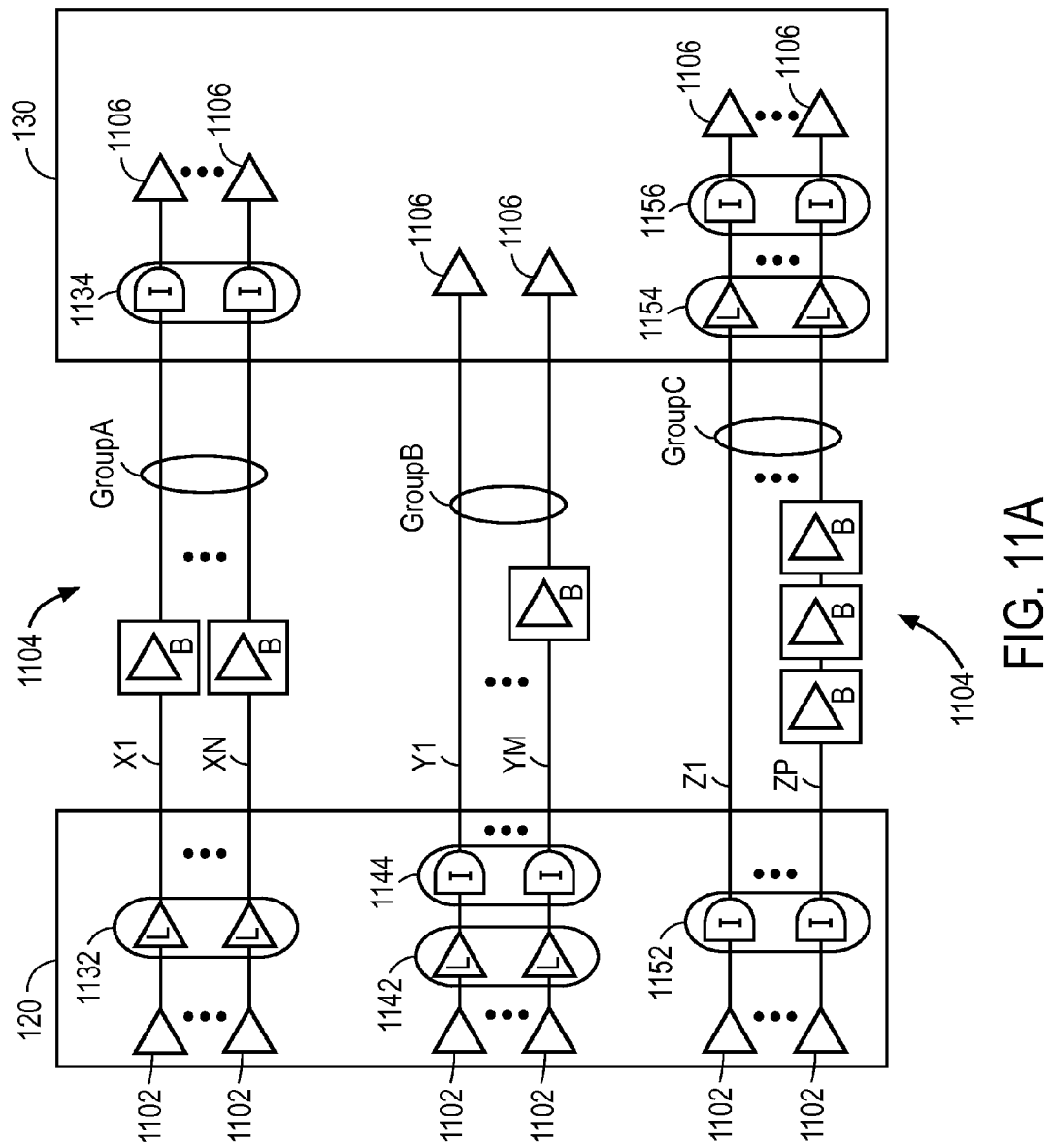
FIGS. 11A-11B are illustrative drawings representing groups of signal paths that are members of a power domain path crossing (FIG. 11A) and the organization of data structures created (FIG. 11B) and stored in a storage device pursuant to the process of FIG. 10 in accordance with some embodiments.
Figure 11B:
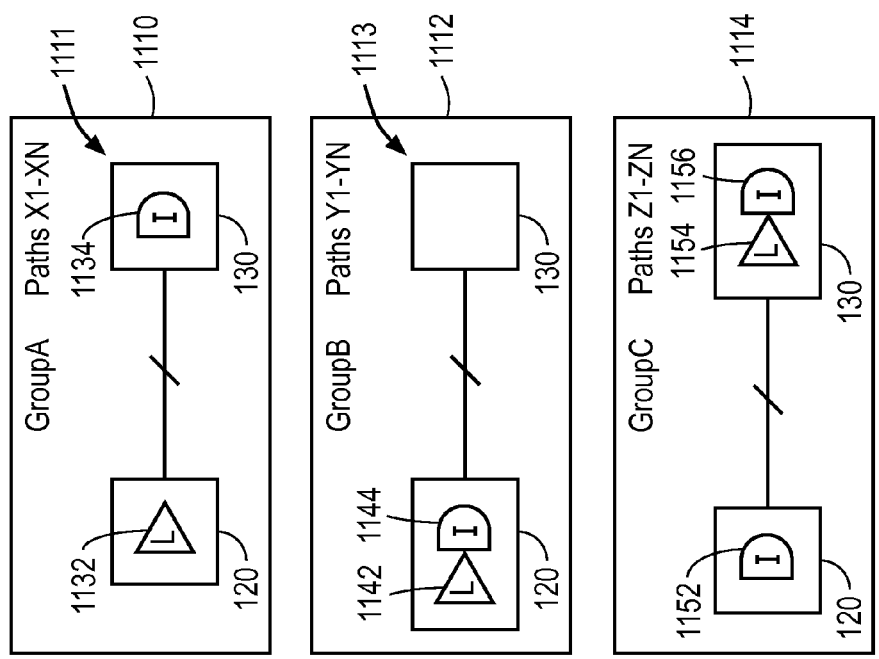

FIGS. 11A-11B are illustrative drawings representing groups of signal paths that are members of a power domain path crossing (FIG. 11A) and the organization of data structures created (FIG. 11B) and stored in a storage device pursuant to the process of FIG. 10 in accordance with some embodiments. FIG. 11A shows example groupings of signal paths for between the first power domain 120 and the second power domain 130, such as interface crossing 302 of FIG. 7. Details of the first and second power domains 120, 130 that are not relevant to this portion of the description are not shown so as to simplify the drawing. A multiplicity of driver instances 1102 within the first power domain 120 drive signals onto corresponding signal paths 1104 that communicate the signals with a multiplicity of receiver instances 1106 within the second power domain 130. It will be appreciated that although this example describes an embodiment in terms of drivers at the beginning of a path and receivers at the other end of the path, in alternative embodiments, a path may have different functional structures at the beginning and end points of the path. A region of the circuit design traversed by the signal paths between the first and second power domains may traverse other power domains (not shown) or may traverse a top level domain. The signal paths are grouped into three groups: GroupA, GroupB and GroupC. GroupA includes signal paths identified as pathX1 to pathXN. GroupB includes signal paths identified as pathY1 to pathYM. GroupC includes signal paths identified as pathZ1 to pathZP.

In the example gate level design of FIG. 11A, the signal paths of GroupA have a first set of power management circuitry components that includes level shifter cells "L" 1132 inserted in the first power domain 120 and have isolation cells "I" 1134 inserted in the second power domain 130. The signal paths of GroupB have a second set of power management circuitry components that includes both a level shifter cells "L" 1142 and isolation cells "I" 1144 inserted in the first power domain 120 and have no power related cells inserted in the second power domain 130. The level shifter cells 1142 and the isolation cells 1144 are ordered relative to the paths in that the level shifter cells 1142 are disposed closer to the drivers than are the isolation cells 1144. The level shifter cells 1142 and the isolation cells 1144 represent power management related circuitry. The signal paths of GroupC have a third set of power management circuitry components that includes an isolation cell "I" 1152 inserted in the first power domain 120 and have both a level shifter cell "L" 1154 and an isolation cell "I" 1156 inserted in the second power domain 130.

Buffer cells "B" have been inserted on certain signal paths. Different signal paths within any given group may have different numbers of inserted buffer cells "B". As explained above, buffer cells, which may have been inserted by a synthesis process, are ignored in the matching of signal paths.

FIG. 11B is an illustrative drawings representing organization of data structures 1110-1114 stored in a storage device to represent information about the three example groups, GroupA, GroupB and GroupC. A first data structure 1110 includes first power cell insertion information 1111 that is applicable to the plurality of signal paths associated with GroupA. The example first power cell insertion information 1111 of the first data structure 1110 indicates that level shifter cells "L" 1132 are inserted within the first power domain 120 and that isolation cells "I" 1134 are inserted in the second power domain 130. The level shifter cells 1132 and isolation cells are ordered relative to the paths in that the level shifter cells 1132 are disposed within the first power domain 120 closer to the driver cells 1102 and the isolation cells are disposed in the second power domain 130 closer to the receivers 1106. The level shifter cells 1132 and the isolation cells 1134 represent power management related circuitry. A second data structure 1112 includes second power cell insertion information 1113 that is applicable to the plurality of signal paths associated with GroupB. The example second power cell insertion information 1113 of the second data structure 1112 indicates that both a level shifter cells "L" 1142 and isolation cells "I" 1144 have been inserted in the first power domain 120 and that no power related cell has been inserted in the second power domain 130. The level shifter cells 1142 and the isolation cells 1144 are ordered relative to the paths in that the level shifter cells 1142 are disposed closer to the drivers than are the isolation cells 1144. The level shifter cells 1142 and the isolation cells 1144 represent power management related circuitry. A third data structure 1114 includes third power cell insertion information 1115 that is applicable to the plurality of signal paths associated with GroupC. The example third power cell insertion information 1115 of the third data structure 1114 indicates that an isolation cell "I" 1152 has been inserted in the first power domain 120 and both level shifter cells "L" 1154 and isolation cells "I" 1156 have been inserted in the second power domain 130. The isolation cells 1152, the level shifting cells 1154 and the isolation cells 1156 are ordered relative to the paths in that the isolation cells 1152 are disposed closer to the drivers and the level shifter cells 1154 and the isolation cells 1156 are disposed closer to the receivers. Moreover the level shifter cells 1154 and the isolation cells 1156 are further ordered relative to the paths in that the isolation cells 1156 are disposed closer to the receiver than are the level shifting cells 1154. The isolation cells 1152, the level shifter cells 1154 and the isolation cells 1156 all represent power management related circuitry.

Figure 12:
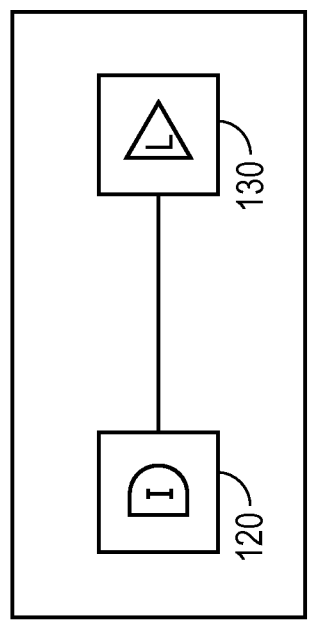
FIG. 12 is an illustrative example data structure stored in a computer readable storage device that indicates power related cell insertions specified by a power intent specification for the power domain crossover signal paths between first and second power domains of FIG. 3.

FIG. 12 is an illustrative example data structure stored in a computer readable storage device that indicates power related cell insertions specified by a power intent specification for the power domain crossover signal paths between the first and second power domains 120, 130. The power management related circuitry added to the power domain crossing paths as indicated by data structures 1110, 1112, 1114 can be compared with the power intent specification requirements as represented by the example data structure of FIG. 12 to determine whether the power management circuitry is added in compliance with the power intent specification, for example. Since each data structure represents a group of power domain crossing paths having the same power management related circuitry, these paths advantageously can be evaluated as a group. Thus, rather than having to separately evaluate thousands or millions of individual paths, paths can be evaluated as a group. Moreover, in some embodiments, paths are grouped not only based upon added power management related circuitry but also based upon the impact of added buffer circuitry. Details of the analysis form no part of the invention and are not further described herein.

Hardware Environment

Figure 13:
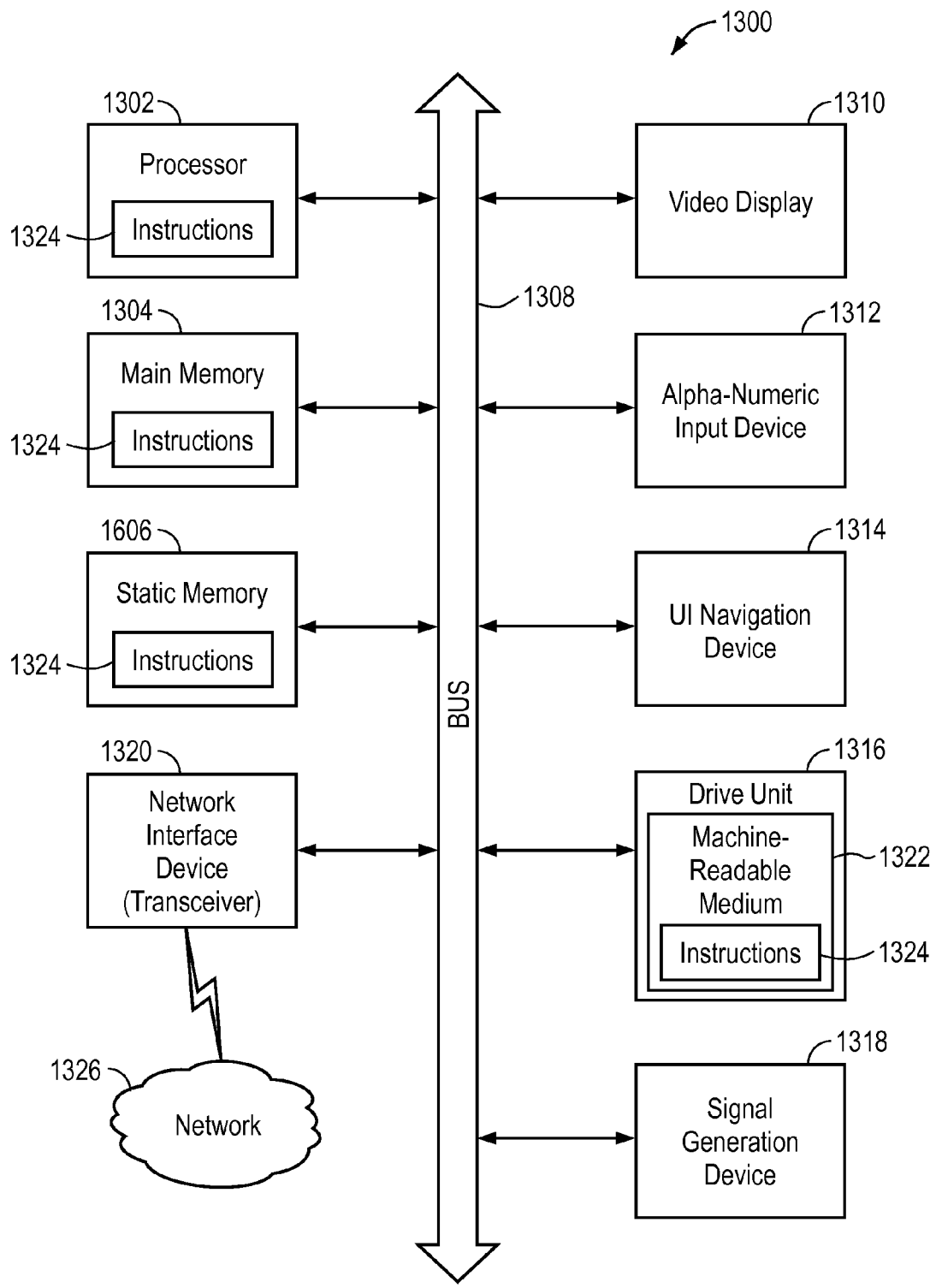
FIG. 13 shows a diagrammatic representation of a machine in the example form of a computer system within which a set of instructions, for causing the machine to perform any one or more of the methodologies discussed herein, may be executed.

FIG. 13 shows a diagrammatic representation of a machine in the example form of a computer system 1300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory storage device 1304 and a static memory storage device 1306, which communicate with each other via a bus 1308. The computer system 1300 may further include a video display unit 1310 (e.g., liquid crystal display (LCD), organic light emitting diode (OLED) display, touch screen, or a cathode ray tube (CRT)). The computer system 1300 also includes an alphanumeric input device 1312 (e.g., a keyboard, a physical keyboard, a virtual keyboard using software), a cursor control device or input sensor 1314 (e.g., a mouse, a trackpad, a trackball, a sensor or reader, a machine readable information reader, bar code reader), a disk drive unit 1316, a signal generation device 1318 (e.g., a speaker) and a network interface device or transceiver 1320.

The disk drive unit 1316 includes a machine-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1326 via the network interface device 1320.

While the machine-readable medium 1322 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method, comprising:
   configuring a computer to test an implemented integrated circuit design, stored in a non-transitory computer readable storage device, for power management circuit design implementation errors by:
   identifying multiple respective power domain crossing paths between respective pairs of power domains;

identifying, for each identified power domain crossing path, one or more respective power related constraints associated with such respective power domain crossing path; and grouping respective power domain crossing paths between matching power domain pairs that are associated with respective matching power related constraints.

2. The method of claim 1 further comprising associating together within a data structure stored in a non-transitory computer readable storage device, the respective power domain crossing paths between matching power domain pairs that are associated with respective matching power related constraints.

3. The method of claim 1, wherein identifying respective power related constraints further comprises:
identifying respective paths within the circuit design that cross between respective pairs of power domains;
tracing the identified respective paths within the circuit design; and
in the course of tracing respective paths, identifying respective power related constraints associated within the circuit design with respective traced paths.

4. The method of claim 3 further comprising in the course of tracing respective paths, identifying respective ordering of respective sets of power related constraints along respective traced paths within the circuit design.

5. The method of claim 1, wherein grouping respective power domain crossing paths further comprises:
comparing respective identified power related constraints associated with respective power domain crossing paths between respective matching pairs of power domains to identify respective matching power related constraints; and
associating together respective power domain crossing paths having respective matching power related constraints within a data structure stored in a non-transitory computer readable storage device.

6. The method of claim 1, wherein respective sets of power related constraints comprise one or more of voltage isolation constraints and level shifting constraints.

7. An article of manufacture, comprising:
a non-transitory computer readable storage device that stores a data structure that tests an implemented integrated circuit design for power management circuit design implementation errors by:
identifying respective power domain crossing paths between respective pairs of respective power domains associated with the integrated circuit design; and
grouping respective power domain crossing paths having respective matching sets of power related constraints.

8. The article of claim 7, wherein the data structure identifies respective power related constraints associated with respective power domain crossing paths.

9. The article of claim 8, wherein the data structure identifies respective ordering of respective power related constraints along respective paths within the circuit design.

10. A system, comprising:
a non-transitory computer readable storage device that stores an implemented integrated circuit design and a data structure that associates respective design instances within the circuit design with respective power domains; and
a computing device in communication with the storage device, configured to perform a method for testing the integrated circuit design for power management circuit design implementation errors comprising:

identifying multiple respective power domain crossing paths between respective pairs of power domains;
identifying, for each identified power domain crossing path, one or more respective power related constraints associated with such respective power domain crossing path; and
grouping respective power domain crossing paths between matching power domain pairs that are associated with respective matching power related constraints.

11. The system of claim 10, wherein identifying respective power related constraints further comprises:
identifying respective paths within the circuit design that cross between respective pairs of power domain;
tracing the identified respective paths within the circuit design; and
in the course of tracing respective paths, identifying respective power related constraints associated within the circuit design with respective traced paths.

12. The system of claim 10, wherein grouping respective power domain crossing paths further comprises:
comparing respective identified power related constraints associated with respective power domain crossing paths between respective matching pairs of power domains to identify respective matching power related constraints; and
associating together respective power domain crossing paths having respective matching power related constraints within a data structure stored in a non-transitory computer readable storage device.

13. A method, comprising:
configuring a computer to test an implemented integrated circuit design, stored in a non-transitory computer readable storage device, for power management circuit design implementation errors by:
identifying multiple respective power domain crossing paths between respective pairs of power domains;
identifying, for each identified power domain crossing path, one or more power management circuitry components inserted within the circuit design on such respective power domain crossing path; and
grouping respective power domain crossing paths between matching power domain pairs that are associated with matching power management circuitry components.

14. The method of claim 13 further comprising associating together within a data structure stored in a non-transitory computer readable storage device, the respective power domain crossing paths between matching power domain pairs that are associated with respective matching power management circuitry components.

15. The method of claim 13, wherein identifying respective power related constraints further comprises:
identifying respective paths within the circuit design that cross between respective pairs of power domains;
tracing the identified respective paths within the circuit design; and
in the course of tracing respective paths, identifying respective power management circuitry components associated within the circuit design with respective traced paths.

16. The method of claim 15 further comprising in the course of tracing respective paths, identifying respective ordering of respective power management circuitry components along respective traced paths within the circuit design.

17. The method of claim 13, wherein grouping respective power domain crossing paths further comprises:
comparing respective identified power related constraints associated with respective power domain crossing paths between respective matching pairs of power domains to identify respective matching power management circuitry components; and associating together respective power domain crossing paths having respective matching power management circuitry components within a data structure stored in a non-transitory computer readable storage device.

18. The method of claim 13, wherein respective power management circuitry components comprises one or more of voltage isolation circuitry and level shifting circuitry.

19. An article of manufacture, comprising:
a non-transitory computer readable storage device that stores a data structure that tests an implemented integrated circuit design for power management circuit design implementation errors by:
identifying respective power domain crossing paths between respective pairs of respective power domains associated with the integrated circuit design; and
grouping respective power domain crossing paths having respective matching power management circuitry components.

20. The article of claim 19, wherein the data structure identifies respective power management circuitry components associated with respective power domain crossing paths.

21. The article of claim 20, wherein the data structure identifies respective ordering of respective power management circuitry components along respective paths within the circuit design.

22. A system comprising:
a non-transitory computer readable storage device that stores an implemented integrated circuit design and a data structure that associates respective design instances within the circuit design with respective power domains; and
a computing device in communication with the storage device, configured to perform a method for testing the implemented integrated circuit design for power management circuit design implementation errors comprising:
identifying multiple respective power domain crossing paths between respective pairs of power domains;
identifying, for each identified power domain crossing path, one or more respective power management circuitry components associated with such respective power domain crossing path; and
grouping respective power domain crossing paths between matching power domain pairs that are associated with respective matching power management circuitry components.

23. The system of claim 22, wherein identifying respective power related constraints further comprises:
identifying respective paths within the circuit design that cross between respective pairs of power domains;
tracing the identified respective paths within the circuit design; and
in the course of tracing respective paths, identifying respective power management circuitry components associated within the circuit design with respective traced paths.

24. The system of claim 23 further comprising in the course of tracing respective paths, identifying respective ordering of respective power management circuitry components along respective traced paths within the circuit design.

25. The system of claim 22, wherein grouping respective power domain crossing paths further comprises:
comparing respective identified power related constraints associated with respective power domain crossing paths between respective matching pairs of power domains to identify respective matching power management circuitry components; and
associating together respective power domain crossing paths having respective matching power management circuitry components within a data structure stored in a non-transitory computer readable storage device.

* * * * *